US010166504B2

(12) United States Patent
Fiveland et al.

(10) Patent No.: US 10,166,504 B2
(45) Date of Patent: Jan. 1, 2019

(54) SYSTEM AND METHOD FOR DESORPTION OF ACID GAS FROM AN ABSORPTION LIQUID

(71) Applicant: COMPACT CARBON CAPTURE AS, Bergen (NO)

(72) Inventors: Torbjørn Fiveland, Skien (NO); Asbjørn Strand, Nesttun (NO)

(73) Assignee: Compact Carbon Capture AS, Bergen (NO)

( * ) Notice: Subject to any disclaimer, the term of this patent is extended or adjusted under 35 U.S.C. 154(b) by 329 days.

(21) Appl. No.: 14/888,241

(22) PCT Filed: May 2, 2013

(86) PCT No.: PCT/NO2013/050079
§ 371 (c)(1),
(2) Date: Oct. 30, 2015

(87) PCT Pub. No.: WO2014/178720
PCT Pub. Date: Nov. 6, 2014

(65) Prior Publication Data
US 2016/0059178 A1 Mar. 3, 2016

(51) Int. Cl.
*B01D 19/00* (2006.01)
*B01D 53/14* (2006.01)
(Continued)

(52) U.S. Cl.
CPC ..... *B01D 53/1425* (2013.01); *B01D 19/0015* (2013.01); *B01D 53/1462* (2013.01);
(Continued)

(58) Field of Classification Search
CPC ................ B01D 53/00; B01D 53/1425; B01D 53/1462; B01D 53/18; B01D 19/00;
(Continued)

(56) References Cited

U.S. PATENT DOCUMENTS

2004/0015003 A1 1/2004 Yang et al.

FOREIGN PATENT DOCUMENTS

| WO | 2011/005118 | 1/2011 | |
| WO | 2012/076657 | 6/2012 | |
| WO | WO 2012076657 A1 * | 6/2012 | ......... B01D 53/1425 |

OTHER PUBLICATIONS

International Search Report dated Nov. 20, 2013 in International Application No. PCT/NO2013/050079.
(Continued)

*Primary Examiner* — T. Bennett McKenzie
(74) *Attorney, Agent, or Firm* — Wenderoth, Lind & Ponack, L.L.P.

(57) ABSTRACT

The present invention relates to a system for desorption of acid gas (1) from an acid gas rich absorption liquid having a steam part (3) and a process part (4). The steam part (3) and the process part (4) are separated to prevent intermixing of fluids in the steam part with fluids in the process part. The system (1) comprises a desorption cylinder (9) which is adapted to rotate about a longitudinal axis of rotation A of the desorption cylinder (9), and a stationary support stand (19) for supporting the desorption cylinder (9), and means for rotating (18) the desorption cylinder. The steam part (3) and the process part (4) are integrated in the desorption cylinder (9) and steam is supplied to the steam part (3) and acid gas rich absorption liquid (2) is supplied to the process part (4). The process part (4) comprises a desorption chamber (12) provided with a stripper unit (33) having an integrated reboiler (52) and the process part (4) is provided with means for discharging an acid gas lean absorption fluid (2) and having means for removing acid gas rich vapor (8), and the steam part (3) is provided with means for discharging condensate (6). The present invention also relates to a
(Continued)

method for desorption of acid gas from an acid gas rich absorption liquid.

47 Claims, 2 Drawing Sheets

(51) Int. Cl.
*B01D 53/18* (2006.01)
*C10L 3/10* (2006.01)

(52) U.S. Cl.
CPC ...... *B01D 53/18* (2013.01); *B01D 2252/2041* (2013.01); *B01D 2252/20405* (2013.01); *B01D 2252/20421* (2013.01); *B01D 2252/20426* (2013.01); *B01D 2252/20431* (2013.01); *B01D 2252/30* (2013.01); *B01D 2252/60* (2013.01); *B01D 2252/602* (2013.01); *B01D 2257/304* (2013.01); *B01D 2257/504* (2013.01); *C10L 3/102* (2013.01); *C10L 2290/541* (2013.01)

(58) Field of Classification Search
CPC ...... B01D 19/0015; B01D 2252/20405; B01D 2252/2041; B01D 2252/20421; B01D 2252/20426; B01D 2252/20431; B01D 2252/30; B01D 2252/60; B01D 2252/602; B01D 2257/304; B01D 2257/504; C10L 3/102; C10L 2290/541
USPC .......................................................... 95/261
See application file for complete search history.

(56) References Cited

OTHER PUBLICATIONS

Written Opinion of the International Searching Authority dated Nov. 20, 2013 in International Application No. PCT/NO2013/050079.

\* cited by examiner

SYSTEM AND METHOD FOR DESORPTION OF ACID GAS FROM AN ABSORPTION LIQUID

FIELD OF INVENTION

The present invention relates to a system and method for desorption of acid gas such as $CO_2$ and/or $H_2S$ from an absorption liquid.

BACKGROUND OF INVENTION

The conventional method and apparatus for removing $CO_2$ and/or $H_2S$ from an absorption liquid is by using a desorption tower where $CO_2$ and/or $H_2S$ is stripped by steam moving up the tower. Steam and absorption liquid following $CO_2$ and/or $H_2S$ over the top is recovered in the condenser over the desorber top. Vapour is formed in the reboiler from where the absorption liquid lean in $CO_2$ and/or $H_2S$ is pumped via the heat recovery heat exchanger and a cooler to the top of the absorption column. Known processes for removing $CO_2$ and/or $H_2S$ from an absorption liquid consist of very large units.

WO 2011/005118 discloses a rotating desorber suitable for desorbing $CO_2$ from a $CO_2$ rich absorption liquid. The rotating desorber has a compact design and is provided with an integrated reboiler and stripper unit, where the $CO_2$ rich absorption liquid is indirectly heated which causes $CO_2$ to be released and water to evaporate from the absorption liquid, resulting in a stream of vapour containing $CO_2$ and a stream of $CO_2$ lean liquid absorption liquid.

SUMMARY OF INVENTION

The aim of the present invention is to provide system and method for desorption of acid gas from an absorption liquid, which is compact and cost efficient both to construct, operate and maintain. Further the present invention aim to provide an improved system and method for desorption of acid gas from an absorption liquid which is energy efficient and can operate with highly pressurized fluids.

According to the present invention, the abovementioned aim is reached by means of a system and a method according to the enclosed independent claims. Further advantageous features and embodiments are mentioned in the dependent claims.

The system according to the invention is advantageous in that the size of the desorber is reduced by more than 90% in addition to a cost reduction of at least 30-50% in comparison to conventional technology. Moreover the compact design and construction reduces investment costs, labor and maintenance. In addition, the compact technology of the system can be constructed at a factory and transported to a site of operation. The construction costs are thereby greatly reduced. Furthermore, the system and method according to the invention is ideal for offshore use due to low weight and reduced $CO_2$ footprint. The system and method according to the invention is also advantageous in that energy is recovered and used for driving of the desorption cylinder.

One advantage with the present invention is that the steam part and the process part are completely separate, a liquid seal between the steam side and the process side is therefore not necessary, and it is thus possible to operate at a greater pressure difference with a very low risk for steam leakage.

The present invention allows for operation with a high pressure difference between steam and process side, up to 10 Bar. This leads to that the produced $CO_2$ is obtained at a higher pressure. As the $CO_2$ usually is stored or utilized at high pressure or in the liquefied state, a higher product pressure lowers the cost for after treatment.

The present invention can be utilized in connection with gas coming from different kind of facilities. These facilities could be combined with cycle gas fired power plants; coal fired power plants, boilers, cement factories, refineries, the heating furnaces of endothermic processes such as steam reforming of natural gas or similar sources of flue gas containing $CO_2$. The present invention can also be employed in facilities handling natural gas, where absorption liquids are used for absorbing $H_2S$ from natural gas.

The present invention can be utilized with any type of absorption liquid suitable for absorbing $CO_2$ or $H_2S$, said of absorption liquid comprising an absorbent and a liquid diluent. Examples of applicable absorption liquid comprise amine based absorption liquid such as primary, secondary and tertiary amines; one well known example of applicable amines is mono ethanol amine (MEA). The liquid diluent is selected among diluents that have a suitable boiling point, are stable and inert towards the absorbent in the suitable temperature and pressure interval. An example of an applicable diluent is water.

Another advantage with the present invention is that desorption of $CO_2$ and/or $H_2S$ from highly viscous absorption liquid can be achieved. The present system provides a very efficient desorption process which can handle absorption liquids having a viscosity of up to 1500 nPa·s which has the advantageous effect that energy is saved on both the process and steam side. Such high level of viscosity can usually not be handled by conventional facilities which are restricted to absorption liquid of lower viscosity levels.

In one embodiment the present desorption system is operates with highly viscous absorption liquid, such as 70 w % MEA.

Another advantage with the present invention is that it allows for the use of higher concentration of the traditional amine based $CO_2$ absorbent, but it may also be used for amine absorption liquid with an amine based concentration of up to 95% by weight.

The absorbent may be selected from primary, secondary and tertiary amines, especially alkanolaminer, examples of such amines are mono ethanol amine (MEA), methyldiethanolamine (MDEA), diisopropanolamine, DEA, or a mixture of different amines.

The present invention is not limited to the use of amine based absorption liquid. It is understood that other absorption liquid than amine based absorption liquid may be used such as ionic liquids. Furthermore, the absorption fluids may optionally comprise additives having promotive effect such as piperazin, enzyme or other promotors.

The present system according to the invention is also advantageous in that it can replace a conventional stripper in a facility for absorption and desorption of $CO_2$ and/or $H_2S$, thereby saving cost and space.

An advantageous aspect of the present invention is that it is possible to combine several process equipment items, e.g. five process equipment units, or unit functions, into fewer, possibly one, compact units. The reduced size of the unit or units allows a very compact construction, and the unit or units could be assembled on one skid.

The present invention may provide solutions for the following problems associated with existing technology:

The compact technology uses less material, strongly reduces the piping needs, and removes the need to work high above the ground as is needed for a conventional column. This is expected to strongly reduce the cost of the desorption unit.

By allowing much smaller, compact equipment units to be made and through its compactness, the customary receiving vessel and reflux pump may be eliminated. These are traditionally standard and thus on the order of 5 conventional units are replaced.

The rotating desorber according to the present invention has a very short residence time with little backmixing. Due to this, thermal degradation of the absorbent solution is expected to be significantly reduced.

The present invention will now be disclosed in further detail with reference to the enclosed figures, wherein.

DETAILED DESCRIPTION OF EMBODIMENTS OF THE INVENTION

For the purpose of simplicity, in this specification the term "acid gas" refers to $CO_2$ or $H_2S$, or a combination of $CO_2$ and $H_2S$. In case the absorption liquid has been utilised in a facility for cleaning a flue gas or the like, the system of the present invention can be used for desorption of $CO_2$ from the absorption liquid. In case the absorption liquid has been utilised in a facility for cleaning natural gas, the system of the present invention can be used primarily for desorption of $H_2S$ from the absorption liquid and optionally also for desorption of $CO_2$ from the absorption liquid. Furthermore, the term "absorbent" is meant to include both absorbent and diluents.

Figure 1:
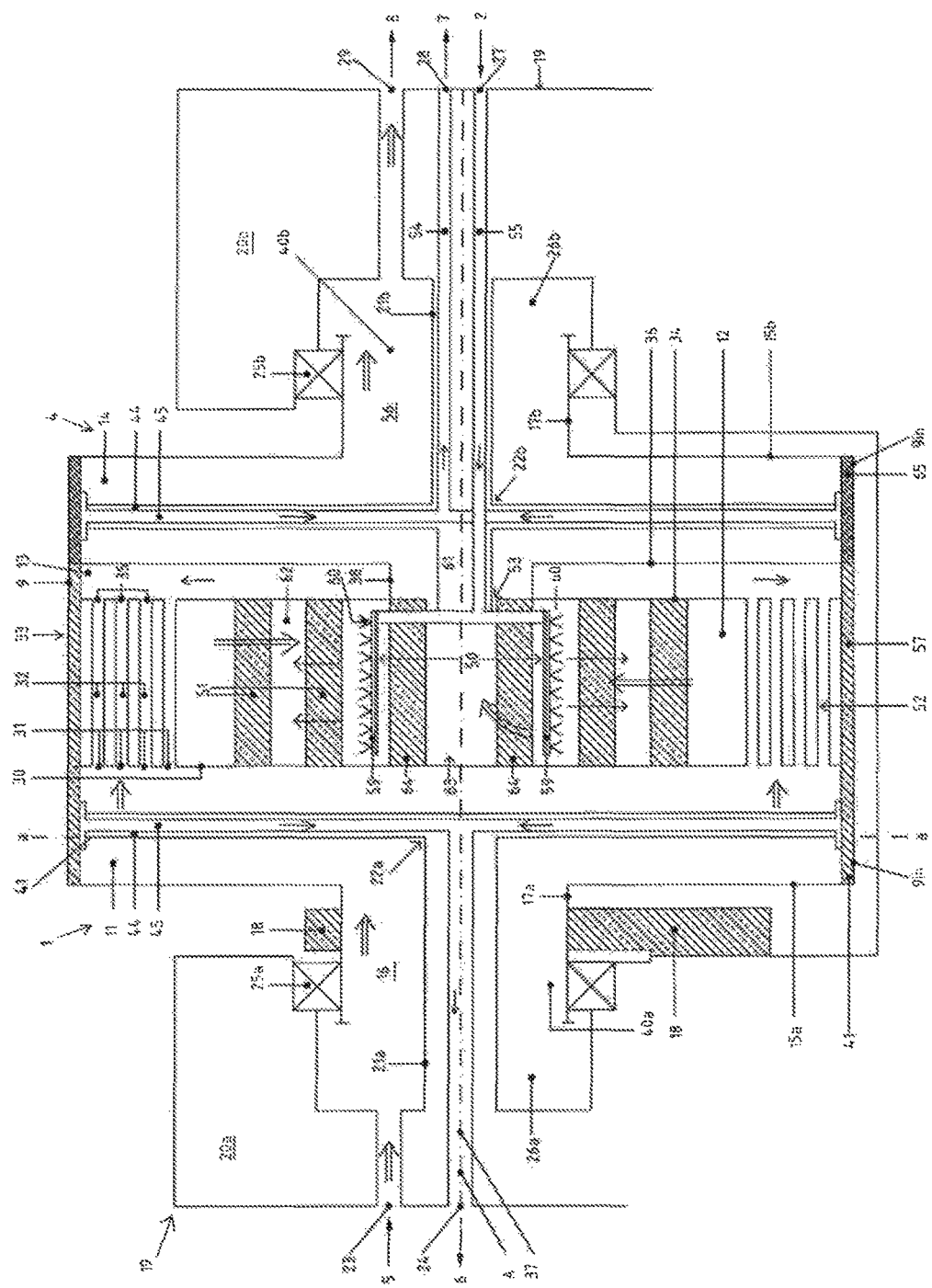
FIG. 1 illustrates schematically a system for desorption according to a first embodiment of the present invention.

FIG. 1 illustrates a first embodiment of a system 1 for desorption of acid gas from a acid gas rich absorption liquid 2 according to the present invention and shows a cross sectional view along a longitudinal axis of rotation of the system for desorption.

The system 1 comprises a steam part 3 and a process part 4. The steam part 3 and the process part 4 are completely separated to prevent intermixing of fluids in the steam part 3 with fluids in the process part 4. Thus, there is no direct exchange of substances or mass transfer between the steam 5 and steam condensate 6 present in the steam part of the system with the process fluids, the absorbent liquids 2, 7 and vapours 8 present in the process part of the system. In FIG. 1 the left side of the system 1 represents the steam part side 3 and the right side represents the process part side 4.

The system 1 comprises a desorption cylinder 9 which is adapted to rotate about a longitudinal axis A arranged through a longitudinally extended core 10 of the desorption cylinder 9.

The desorption cylinder 9 is divided into several internal chambers by dividing walls 30,34,36 and comprises a first liquid collecting chamber 11, a desorption chamber 12, a condensate guiding chamber 13 and a second liquid collecting chamber 14. The desorption cylinder 9 is further provided with outer side walls 15*a*, 15 *b* having centrally arranged openings 16*a*, 16*b* to which hollow axles 17*a*, 17*b* are connected. The hollow axles 17*a*, 17*b* project outwards in the longitudinal direction from the cylinder 9. The perimeter of the cylinder 9 has an inside surface reference by $9_{in}$.

The desorption cylinder 9 and the internal chambers 11,12,13,14 and the elements thereof are arranged such that the steam part 3 and the process part 4 are integrated in the desorption cylinder 9. Thereby a compact system for desorption is achieved. By integration is meant that the elements of the steam part 3 and the elements of the process part 4 are arranged and combined in the desorption cylinder such that efficient desorption is achieved without mixing the fluids from the steam part 3 and the process part 4.

Heat is indirectly transferred from the steam part 3 to the process part 4 without direct mixing of steam 5 and/or condensate 6 present in the steam part with the process fluids 2, 7, 8 present in the process part. This is advantageous in that separate liquid seals between the steam part and the process part are not necessary which permits that the system can be used also with highly pressurized fluids of up to 10 Bar.

This is achieved by arranging the system 1 such that steam 5 enters and condensate 6 exits the system in the steam part 3, and the process fluids, absorbent liquids 2, 7 and vapours 8 comprising acid gas components enters and exits the system in the process part 4.

The system also comprises means for rotating 18 the desorption cylinder such as an electrical motor 18 and coupling means attached to the desorption cylinder 9.

The rotation of the cylinder 9 results in a centrifugal force which influences the liquids present in the desorption cylinder 9 and forces the liquids to move towards the perimeter of the chambers, in close proximity to the inside surface of the desorption cylinder. This is advantageous in that desorption of acid gas from acid gas rich absorption liquid 2 in the desorption chamber is forced to move counter current to heated vapours moving towards a core 10 in the centre of the chamber, which provides for efficient desorption process.

The system further comprises a stationary support stand 19 for supporting the desorption cylinder 9. The stationary support stand is provided with a first support housing 20*a* on the steam part side, having a first stationary shaft 21*a* which is longitudinally extended along the axis of rotation A and having shaft journal 22*a*, a steam inlet 23, a condensate outlet 24, bearing and sealing means 25*a*, and an annular recess 26*a* surrounding the first stationary shaft 21*a* to receive the first rotating hollow axle 17*a* projecting from the desorption cylinder 9.

The stationary support stand 19 is also provided with second support housing 20*b* on the process part side having a second stationary shaft 21*b* which is also longitudinally extended along the axis of rotation A and having shaft journal 22*b*, a rich absorbent inlet 27, a lean absorbent outlet 28, a vapour outlet 29, bearing and sealing means 25*b*, and an annular recess 26*b* surrounding the second stationary shaft to receive the second rotating hollow axle 17*b* projecting from the desorption cylinder 9. The process side of the system is further described below.

The support stand 19 is connected to the desorption cylinder 9 in that the first and the second stationary shafts 21*a*, 21*b* with shaft journals 22*a*, 22*b* project through the openings 16*a*, 16*b* of the hollow rotating axles 17*a*, 17*b* of the desorption cylinder 9 whereby the stationary shafts 21*a*, 21*b* and the rotating axles 17*a*, 17*b* are coaxially arranged about the longitudinal axis of rotation A. The hollow rotating axles 17*a*, 17*b* of the desorption cylinder surrounds the stationary shafts 21*a*, 21*b* and are received by the annular recesses 26*a*, 26*b* in the first and second housing 20*a*, 20*b*, respectively. Suitable bearing and sealing means 25*a*, 25*b* are provided between the housings 20*a*, 20*b* of the stationary support stand and the rotating axles 17*a*, 17*b* respectively of the desorption cylinder 9. Between the stationary shafts 21*a*, 21*b* and the rotating axles 17*a*,17*b* respectively are gaps 40*a*, 40*b* formed wherein conduits and/or channels for fluids are arranged.

The first stationary shaft journal 22a projects into the centre, the core part 10, of a first liquid collecting chamber 11 in the desorption cylinder 9. A steam supply conduit 16 and a condensate outlet conduit 37 are provided along the first stationary shaft 21a. The steam supply conduit 16 is provided in the gap 40a between the stationary shaft 21a and the rotating axle 17a, whereas the condensate outlet conduit 37 is arranged within the stationary shaft 21a.

The first stationary shaft 21a and shaft journal 22a are also provided with means for collecting condensate, further explained below.

The steam side 3 of the desorption cylinder 9 comprises a first liquid collecting chamber 11 and a condensate guiding chamber 13. The desorption chamber 12 of the process part of the system 1 is arranged between the first liquid collecting chamber 11 and a condensate guiding chamber 13. A first dividing wall 30 is arranged in the desorption cylinder 9 between the first liquid collecting chamber 11 and the desorption chamber 12. The first dividing wall 30 is connected to the inside surface $9_{in}$ of the desorption cylinder. The dividing wall 30 is provided with tube openings 31 corresponding to thousands of tubes 32 arranged in tube bundles of a stripper unit 33 arranged within the desorption chamber 12. The outside of the tubes 32 are directed towards the inside of the desorption chamber 12. For the purpose of simplicity, only a few tubes and tube openings are shown in FIG. 1.

The first liquid collecting chamber 11 is thereby formed between the wall 15a, dividing wall 30 and an outer perimeter of the liquid collecting chamber, said outer perimeter being a part of the inside surface of the rotating cylinder wall $9_{in}$.

The first liquid collecting chamber 11 is part of the steam part 3 of the system. In operation chamber 11 receives steam from the steam supply conduit 16 which is distributed to the tube openings 31 of the tubes 32 provided in the dividing wall 30. The chamber 11 further receives the returning condensate from the steam guiding chamber 13 via the outermost tubes 32 positioned close to the outer perimeter of the chamber 11.

The condensate guiding chamber 13 is arranged between the desorption chamber 12 and the second liquid collecting chamber 14. Between the desorption chamber 12 and the condensate guiding chamber 13 a second dividing wall 34 is arranged which is provided with tube openings 35 corresponding to the thousands of tubes 32 of the stripper unit 33 such that the condensate guiding chamber 13 is in fluid communication with the first liquid collecting chamber 11 via the tubes 32.

Between the condensate guiding chamber 13 and a second liquid collecting chamber 14 is a third dividing wall 36 arranged. The second dividing wall 34 and the third dividing wall 36 are connected to the inside surface $9_{in}$ of the desorption cylinder 9.

The second dividing wall 34 and third dividing wall 36 are also connected by a chamber surface 38' in the region of the core 10 in the center of the cylinder 9.

Thus, the condensate guiding chamber 13 is formed by the second dividing wall 34, the third dividing wall 36 and the chamber surface 38' and the inside surface $9_{in}$ of the cylinder 9. The condensate guiding chamber 13 is in fluid communication only with first liquid collecting chamber 11 on the steam side 3 of the desorption system 9.

In operation steam 5 is fed into the stationary support housing 20a and through the steam supply conduit 16 into the first liquid collecting chamber 11. Steam 5 enters the tubes 32 of the stripper unit 33 and indirectly heats acid gas rich absorption liquid 2 on the outside of the tubes 32, thus providing heat for an endothermic desorption of acid gas by condensation of steam 5.

Condensed steam, condensate 6, flows into the condensate guiding chamber 13 and guided to the outer perimeter of the chamber 13 by effect of the centrifugal force resulting from rotation of the desorption cylinder 9 (see indicating arrows in FIG. 1). The condensate 6 returns to first liquid collecting chamber 11 via the outermost tubes 32 connecting the condensate guiding chamber 13 with the first liquid collecting chamber 11, said outermost tubes 32 being arranged in close proximity of the inside perimeter of the cylinder 9.

In operation the condensate 6 forms a layer of liquid 41 on the outer perimeter of the first liquid collecting chamber 11. The condensate 6 is removed from the liquid collecting chamber 11 by means for discharging condensate, a stationary diffuser 42, provided in the chamber 11, further described below.

Figure 2:
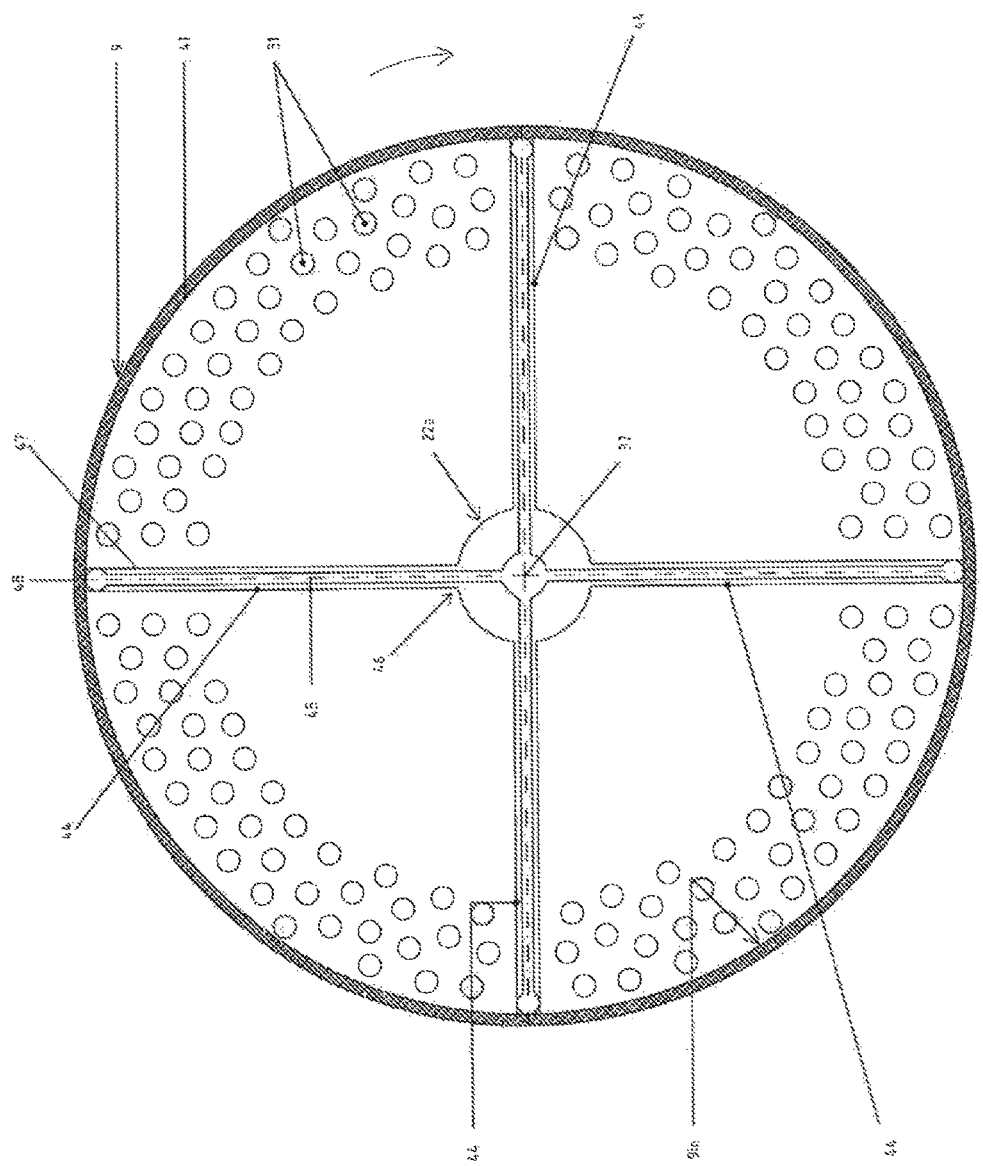
FIG. 2 illustrates a section along line a-a of the desorption cylinder illustrated in FIG. 1.

FIG. 2 illustrates a section along line a-a of the desorption cylinder 9 illustrated in FIG. 1, in particular the figure shows a stationary diffuser 42 which is connected to the first stationary shaft journal 22a arranged in the centre of the chamber 11. The diffuser 42 discharges liquid from the first liquid collecting chamber 11. The diffuser 42 is provided with at least one diffuser arm 44, however depending on the size of the desorption cylinder 9 and mass volumes of condensate 6, the diffuser 42 may comprise up to 20 diffuser arms 44 or more. Preferably the diffuser arms 44 are symmetrically arranged around the stationary shaft journal 22a. Each diffuser arm 44 is formed like a hollow pipe having a diffuser conduit 45 which has a first end 46 attached to the end of the shaft journal 22a and a second end 47 which is free and provided with a liquid inlet 48. The liquid inlet 48 is arranged in near proximity of the outer perimeter of the liquid collecting chamber, the inside surface of the cylinder wall $9_{in}$, such to extend into a condensate layer formed on the inside surface of the cylinder wall when the desorption system is in operation.

In FIG. 2 the diffuser arm 44 is formed straight in the radial direction. For the purpose of simplicity, reference signs are only indicated for one arm, however, all diffuser arms 44 in the figure are identical.

In another embodiment (not shown) the diffuser arms 44 may be curved or S-shaped in the radial direction, in the plane of the cross-section shown in FIG. 2.

The diffuser conduit 45 provides fluid communication between the liquid inlet 48 and the condensate outlet conduit 37 arranged integrated in the first stationary shaft 21a. The diffuser 42 uses the kinetic energy of the condensate 6 in the rotating liquid layer 41 during operation to discharge, transport the condensate out of the desorption cylinder 9, thus at least a part of the supplied energy to the system for desorption is recovered, in particular a part of the energy supplied in order to rotate the desorption cylinder 9.

The diffuser 42, in particular the liquid inlets 48, are formed such that kinetic energy in the liquid layer, the steam condensate, is converted into a pressure head when the steam condensate 6 is collected. Thus energy is recovered by converting kinetic energy in the liquid layer 41 into a pressure head by the diffuser 42 and using the pressure head to discharge liquid from the liquid collecting chamber 11.

It is advantageous to use a diffuser 42 for removing the condensate in that the kinetic energy is converted into a pressure head which efficiently discharges, pumps the liquid out of the system. Thus there is no need for separate pumps which is beneficial.

In operation, the condensate 6 forms a liquid layer on at least a portion of the outer perimeter of the first liquid collecting chamber 11. However, the liquid layer may cover the whole outer perimeter of the first liquid collecting chamber 11.

The condensate enters the stationary liquid inlets 48 of the diffuser arms 44 and flows through the diffuser conduits 45 towards the shaft journal 22a of the first stationary shaft 21a and to the condensate outlet conduit 37, whereby the condensate 6 is discharged from the system 1 (see indicating arrows in FIG. 1).

The process part 4 of the desorption cylinder comprises the desorption chamber 12 and a second liquid collecting chamber 14. The desorption chamber 12 comprises a liquid distributor 50, at least one desorber packing bed 51 of porous material and a stripper unit 33 having an integrated reboiler 52 arranged between the inner core 10 in the centre of the desorption chamber 12 and the outer perimeter of the desorption chamber 12, which is a part of the inside surface of the cylinder wall $9_{in}$. The second liquid collecting chamber 14 is arranged next to the condensate guiding chamber 13 and is provided with a diffuser 42 of the same type as the diffuser arranged in the first liquid collecting chamber 11.

The desorption chamber 12 is arranged in order to achieve efficient desorption of acid gas from rich absorption liquid 2 resulting in lean absorption liquid 7 and vapour 8 comprising acid gas and water. The centrifugal force due to the rotation of the cylinder 9 forces the rich absorption liquid 2 to flow in the radial direction outwards towards the perimeter of the chamber whereas the vapour 8 moves inwards to the core 10 of the desorption chamber 12 (see indicating arrows in FIG. 1). The vapour 8 is removed via a vapour outlet, an opening 53, due to a lower pressure at the vapour outlet.

The second stationary shaft journal 22b projects into the second liquid collecting chamber 14 and is arranged in the core 10 in of the chamber 12 along the longitudinal axis A of the cylinder 9. The second stationary shaft 21b is provided with a supply conduit 55 for supplying acid gas rich absorption liquid into the desorption chamber 12, an outlet conduit 54 for removing lean absorption liquid 7 after the desorption process and. A vapour outlet channel 56 to remove the vapour 8 containing water and acid gas is provided in the gap 40b along the stationary shaft 21b. In FIG. 1 the conduit 55 for supplying acid gas rich absorption liquid and the lean absorption liquid outlet conduit 54 are integrated in the second stationary shaft 21b. However, alternatively the conduits 54, 55 may be arranged on the outside of the second stationary shaft 21b.

The second liquid collecting chamber 14 is formed between the wall 15b, the dividing wall 36 and an outer perimeter of the liquid collecting chamber 14, said outer perimeter being a part of the inside surface of the rotating cylinder wall $9_{in}$.

The desorption chamber 12 is in fluid communication with the second liquid collecting chamber 14 via an opening 53 provided through the dividing walls 34,36,38 forming the condensate guiding chamber 13. The opening 53 is arranged in the core 10 of the desorption chamber and in proximity of the rotational axis A. The opening 53 functions as vapour outlet for vapour 8.

The desorption chamber 12 is also in fluid communication with the second liquid collecting chamber 14 via passages 57, tubes, provided at the outer perimeter of the desorption chamber 12 in order to discharge the acid gas lean absorption liquid 7. The passages 57 are provided as tubes extending from the desorption chamber 12 through the condensate guiding chamber 13 to the second liquid collecting chamber 14.

The liquid distributor 50 is arranged in the core 10 of the desorption chamber 12 in order to distribute acid gas rich absorption liquid into the desorption chamber. The stationary shaft journal 22b supports the liquid distributor 50 and is connected to the liquid distributor with connecting means 61 extending through the opening 53.

The liquid distributor 50 is connected to the shaft journal 22b to be in fluid communication with the supply conduit 55 for supplying the acid gas rich absorption liquid 2.

In FIG. 1 the liquid distributor 50 is stationary, however alternatively, in another embodiment of the invention (not shown in figure) the liquid distributor 50 is rotatable arranged about the longitudinal axis of rotation A by the connecting means 61.

The liquid distributor 50 is arranged such that the acid gas rich absorption liquid is evenly distributed in the chamber 12. In FIG. 1 the liquid distributor comprises a plurality of spray arms 59 symmetrically arranged around the longitudinal axis A. The FIG. 1 only shows 2 two spray arms, however 2-12 spray arms may be used, depending on size of the desorption cylinder. The spray arms 59 have spray means, nozzles 60. However, other means of feeding liquids may also be envisaged, such as perforated pipes or similar.

The stripper unit 33 has an integrated reboiler 52. The stripper unit is arranged such that heat is supplied throughout the whole stripper unit 33. The inner part of the stripper unit near the axis of rotation A is a desorber part without external heat supply, heat is instead supplied by the vapour 8 flowing towards the core 10 in the centre of the chamber. The desorber part of the stripper unit 33 comprises at least one layer of porous material, a desorber packed bed 51. In FIG. 1, the desorption chamber is provided with two layers of desorber packed bed 51.

The outer part of the stripper unit 33 comprises the integrated reboiler 52 provided with several thousands of small tubes 32 arranged in tube bundles which indirectly supply heat for the endotermic reaction of the acid gas rich absorption liquid. The small tubes 32 can be fixed to the radially directed first and second dividing walls 30, 34 in the desorption chamber 12 using conventional roller expander techniques. For the purpose of illustration only a few tubes 32 are shown on each side of the axis of rotation in FIG. 1, however the reboiler 52 may comprise any number of tubes arranged in tube bundles.

In operation the liquid distributor 50 sprays acid gas rich absorption liquid onto the is desorber packed bed 51 (see indicating arrows in FIG. 1), which is attached to the dividing walls 30, 34 thereby rotating about the axis of rotation A. The desorber packed bed 51 is arranged in close proximity to the nozzles 60 such that absorption liquid penetrates into the porous material 51 and is exposed to heated vapours 8 moving towards the core 10. This has the effect that acid gas is released from the rich absorption liquid by the vapours and the rich absorption liquid is preheated by the vapours 8 in advance of the stripper unit 33, which is energy efficient.

The desorber packed bed 51 comprises a porous material, such as a foam or matrix of metal. The porous material provides several advantageous effects, primarily the porous material provides additional surface area for the mass transfer and for distributing the absorption liquid to provide improved desorption. The porous material comprises a fine metal mesh with wire diameter 0.5-1 mm diameter which gives a specific surface area above 400-500 $m^2/m^3$ depending on mesh spacing.

Each desorber packed bed 51 forms an annular layer of porous material, like a cylinder of porous material, arranged about the longitudinal axis A. The desorber packed bed 51 is attached by suitable means to the radially directed first and second dividing walls 30, 34 of the desorption chamber 12 such that the desorber packed bed 51 rotates together with the desorption cylinder 9.

The desorber part of the stripper unit 33 comprises at least one layer of desorber packed bed 5. For the purpose of explanation, the desorption chamber 12 in FIG. 1 is provided with two layers of desorber packed bed 51. However, preferably the desorption chamber is provided with a plurality of packed beds, preferably 2-10 desorber packed beds, more preferably the desorption chamber is provided with 2-4 desorber packed beds (not shown in figure).

Said plurality of desorber packed beds 51 are consecutively arranged in the radial direction between the liquid distributor 50 and the stripper unit 33, wherein the desorber packed beds 51 are cylindrical and coaxially arranged about the longitudinal axis of rotation A, and the packed beds 51 are separated by a separating space 62. Between two consecutively arranged packed beds 51 there is a provided a separating space of preferably 1-5 cm, more preferably 1-3 cm, to provide for desorption of acid gas components in the vapour moving inwards.

In addition, there is also space to provide supporting means between the packed beds.

The desorber packing beds 51 may be attached by suitable supporting means to the radially directed first and second dividing walls 30,34 of the desorption chamber 12 such that the packing beds rotate together with the desorption chamber 12. By providing a plurality of packed beds, the desorption of acid gas components from the rich absorption liquid 2 is improved since the vapour 8 moving inwards towards the core 10, is forced to pass through each layer of packed bed 51 whereby acid gas is desorbed from the rich absorption liquid 2.

The absorption liquid 2 which has been preheated from the counter flowing vapour 8 upon passage through the porous material of the desorber part of the stripper unit is further transferred to the reboiler part by effect of the centrifugal forces.

In the reboiler 52 the absorption liquid 2 is indirectly heated, whereby the acid gas components $CO_2$ and/or $H_2S$ are released from the absorption liquid due to the heat increase. The absorption liquid 2 is significantly stripped of acid gas and is allowed to leave the rotating desorption chamber 12 via the passages 57 at the outer perimeter of the desorption chamber 12. An inward flow of vapour 8 is formed in the reboiler section 52 forming a periphery part of the stripper unit 33.

Vapour 8 comprising acid gas components $CO_2$ and/or $H_2S$ and water vapour is forced towards the centre through the porous material 51 and to the core 10 (see indicating arrows in FIG. 1) where rich absorption liquid 2 is sprayed upon the porous material in the desorber packing bed 51 arranged closest to the liquid distributor 50. The $CO_2$ and/or $H_2S$ and water vapour is then directed to the opening 53 and the vapour outlet channel 56 due to lower pressure at the vapour outlet 29.

A part of the absorption liquid 7 lean on acid gas and moving radially outwards due to the effect of centrifugal forces, is evaporated caused by condensing steam on the warm side of the heat exchanger/reboiler section 52. Droplets of evaporated lean absorption liquid 7 follows the vapour 8 towards the core of the desorption chamber 12.

It is advantageous to remove the droplets of evaporated lean absorption liquid 7 from the vapour 8, this is achieved by arranging a layer of a desorber packed bed 64 of porous material in the core of the desorption chamber 12 for the purpose of condensing the droplets of evaporated lean absorption liquid 7.

In the embodiment of the invention shown in FIG. 1 a desorber packed bed 64 of porous material is provided in the core 10 and arranged between the axis of rotation A and the liquid distributor 50 such that the vapour flow moving towards the vapour outlet, the opening 53, passes through the porous material 64. The packed bed is formed like a cylinder and may be provided with an inner hollow channel 63 which provides a removal path for the vapour leaving the desorption chamber through the opening 53 into the second liquid collecting chamber 14. In the embodiment of the invention shown in FIG. 1 the packed bed 64 is attached to the walls of the desorption chamber and is arranged to rotate about the axis of rotation. In another embodiment (not shown) the packing bed is arranged to be stationary. The packed bed 64 provided in the core 10 operates as a condenser such that droplets accompanying the vapour flow or reflux of absorption liquid which have evaporated in the desorption process are removed from the vapour containing $CO_2$ and/or $H_2S$ and the absorption liquid is forced to move radially outwards in the chamber by effect of the centrifugal forces during rotation of the cylinder.

The second liquid collecting chamber 14 is adapted to receive lean absorption liquid 7 from the desorption chamber 12 via passages 57. The lean absorption liquid 7 forms a liquid layer 65 on the inside of the outer perimeter of the second liquid collecting chamber 14. The second liquid collecting chamber 14 is provided with means for discharging the collected absorption liquid, a diffuser 42 discharging the liquid 7 from the desorption cylinder 9 via the outlet conduit 54 for lean absorption liquid. The diffuser 42 is of similar type as the diffuser previously described.

Energy is recovered by converting kinetic energy in the liquid layer 65 into a pressure head by the diffuser 42 and using the pressure head to discharge liquid from the liquid collecting chamber 14.

The lean absorption liquid 7 is collected and removed by the diffuser (see indicating arrows in FIG. 1) which recovers the kinetic energy in the liquid layer 65 formed on the outer perimeter cylinder 9 by the effect of centrifugal force. The pressure obtained is typically less than 0.5 Bar, however this is sufficient for removing the liquid.

In operation of the system of desorption, the desorption cylinder is rotated by means of the driving means 18. The chambers 11, 12, 13, 14 all rotate together with the cylinder, the desorber packed bed 51 and the stripper unit 33 also rotate with the cylinder. The liquid distributor 50 and the desorber packed bed 64 may rotate or alternatively be stationary. The diffusers 42 are connected to the support stand 19 and are therefore stationary.

The system 1 according to the invention is suitable for operation with an absorption liquid which has a an amine concentration up to 95% by weight.

Suitable absorption liquids are for example one of the following MEA, MDEA, DEA, or a mixture of different amines.

The system is also readily usable for desorption of acid gas from other absorption liquids like ionic fluid. Furthermore, the absorption liquids may optionally comprise additives having promotive effect such as piperazin, enzyme or other promotors.

The present system provides a very efficient desorption process which can handle is absorption liquids having a viscosity of up to 1500 nPa·s which has the advantageous effect that energy is saved on both the process and steam side. Such high level of viscosity can usually not be handled by conventional facilities which are restricted to absorption liquids of lower viscosity levels.

The invention claimed is:

1. A system for desorption of acid gas (1) from an acid gas rich absorption liquid (2) having a steam part (3) and a process part (4), wherein the steam part (3) is arranged to indirectly the heat acid rich absorption liquid (2) in the process part (4) and the steam part (3) and the process part (4) are separated to prevent intermixing of fluids in the steam part (3) with fluids in the process part (4),
the system (1) comprising a desorption cylinder (9) which is adapted to rotate about a longitudinal axis of rotation A of the desorption cylinder (9), and a stationary support stand (19) for supporting the desorption cylinder (9), and means for rotating (18) the desorption cylinder (9),
wherein the steam part (3) and the process part (4) are integrated in the desorption cylinder (9),
wherein, in use, steam is supplied to the steam part (3) and the acid gas rich absorption liquid (2) is supplied to the process part (4),
wherein the process part (4) comprises a desorption chamber (12) provided with a stripper unit (33) having an integrated reboiler (52) that, in use, is arranged to receive steam supplied to the steam part (3) and the acid gas rich absorption liquid (2) supplied to the process part (4) to thereby indirectly heat the acid gas rich absorption liquid (2),
wherein the process part (4) is provided with means for discharging an acid gas lean absorption fluid (7) and having means for removing acid gas rich vapour (8),
wherein the steam part (3) is provided with means for discharging condensate (6),
wherein the stationary stand (19) is provided with a first stationary shaft (21a) and a second stationary shaft (21b) which are coaxial with the axis of rotation A of the desorption cylinder (9), and where the first stationary shaft (21a) and the second stationary shaft (21b) extend into the desorption cylinder (9),
wherein the steam part (3) is provided with a steam supply conduit (16) and a condensate outlet conduit (37) arranged along the first stationary shaft (21a), and
wherein the process part (4) is provided with a supply conduit (55) for supplying acid gas rich absorption liquid (2), and a lean absorption liquid outlet conduit (54) arranged along the second stationary shaft (21b).

2. The system according to claim 1, wherein the desorption chamber (12) is arranged between a first liquid collecting chamber (11) and a second liquid collecting chamber (14).

3. The system according to claim 2, wherein the first liquid collecting chamber (11) is in fluid communication with a condensate guiding chamber (13) via tubes (32) in the stripper unit (33).

4. The system according to claim 3, wherein steam condensate is collected in the condensate guiding chamber (13) and transferred to the first liquid collecting chamber (11) via tubes (32) arranged proximal to the outer perimeter of the condensate guiding chamber (11).

5. The system according to claim 1, wherein the desorption chamber (12) is in fluid communication with a second liquid collecting chamber (14) via an opening (53).

6. The system according to claim 5, wherein the desorption chamber (12) is connected to the second liquid collecting chamber (14) via passages (57) provided proximal to the outer perimeter of the desorption chamber (12) for removing the acid gas lean absorption liquid (7) from the desorption chamber (12).

7. The system according to claim 1, wherein the desorption chamber (12) comprises a liquid distributor (50) arranged in a core (10) of the desorption chamber (12).

8. The system according to claim 7, wherein the liquid distributor (50) comprises at least one spray arm (59).

9. The system according to claim 7, wherein the liquid distributor (50) is rotatable arranged about the axis of rotation A.

10. The system according to claim 7, wherein the liquid distributor (50) is stationary.

11. The system according to claim 7, wherein the desorption chamber (12) is provided with at least one layer of desorber packed bed (51, 64) of a porous material.

12. The system according to claim 11, wherein the at least one layer of desorber packed bed (64) is arranged between the axis of rotation A and the liquid distributor (50), wherein the packed bed (64) is arranged to rotate about the axis of rotation A.

13. The system according to claim 11, wherein the at least one layer of desorber packed bed (64) is arranged between the axis of rotation axis A and the liquid distributor (50), wherein the desorber packed bed (64) is arranged to be stationary.

14. The system according to claim 12, wherein the desorber packed bed (64) is provided with a vapour channel (63).

15. The system according to claim 11, wherein at least one layer of desorber packed bed (51) is provided between the liquid distributor (50) and the stripper unit (33), and the packed bed (51) being arranged to rotate together with the desorption cylinder (9).

16. The system according to claim 11 provided with at least two layers of desorber packed bed (51) which are consecutively arranged in the radial direction between the liquid distributor (50) and the stripper unit (33), and wherein the two layers of desorber packed bed (51) are separated by a separating space (62).

17. The system according to claim 16, wherein the desorption chamber comprises 2-10 layers of desorber packed bed (51), the layers of packed beds being consecutively arranged in the radial direction between the liquid distributor (50) and the stripper unit (33).

18. The system for desorption according to claim 1, wherein heat is supplied throughout an entirety of the stripper unit (33).

19. The system according to claim 1, wherein an inner part of the stripper unit (33) near a core (10) of the desorption chamber (12) is a desorber part without external heat supply whereas a periphery part of the stripper unit (33) is heated as a reboiler (52).

20. The system according to claim 11, wherein bundles of tubes (32) of the stripper unit (33) are arranged between the desorber packed bed (51) and the outer perimeter of the desorption chamber (12).

21. The system according to claim 2, wherein the first liquid collecting chamber (11) is provided with a diffuser (42) for discharging condensate (6) from the first liquid collecting chamber (11).

22. The system according to claim 2, wherein the second liquid collecting chamber (14) is provided with a diffuser (42) for discharging acid gas lean absorption liquid (7) from the second liquid collecting chamber (14).

23. The system according to claim 21, wherein the diffuser (42) is formed such that kinetic energy in the liquid (6,7) is converted into a pressure head when the liquid (6,7) is collected by the diffuser (42).

24. The system according to claim 21, wherein the diffuser (42) is stationary and connected to a stationary shaft journal (22a,22b) connected to the support stand (19).

25. The system according to claim 24, wherein the diffuser (42) is provided with at least one diffuser arm (44) having a first end (46) attached to the stationary shaft journal (22a, 22b) and a free second end (47), and wherein the free second end (47) of the diffuser arm is provided with a liquid inlet (48) and wherein the diffuser arm comprises a diffuser conduit (45).

26. The system according to any one of the claim 25, wherein the liquid inlet (48) of the diffuser arm (44) is arranged near a perimeter of the liquid collecting chamber (11, 14) and is adapted to extend into a liquid layer (41,65) formed on the inside surface of the perimeter of the liquid collecting chamber (11,14) when the system is in operation.

27. The system according to claim 25, wherein the diffuser arm (44) is formed straight in the radial direction.

28. The system according to claim 25, wherein the diffuser arm (44) is formed curved or S-shaped in the radial direction.

29. The system according to claim 1, wherein the acid gas (1) comprises $CO_2$ and/or $H_2S$.

30. The system according to claim 1, wherein the absorption liquid has an amine concentration up to 95% by weight.

31. The system according to claim 1, wherein the acid gas rich absorption liquid (2) has viscosity of up to 1500 nPa·s.

32. The system according to claim 1, wherein the acid gas rich absorption liquid (2) comprises at least one selected from the group consisting of mono ethanol amine (MEA), methyldiethanolamine (MDEA), and diisopropanolamine (DEA).

33. The system according to claim 1, wherein the acid gas rich absorption liquid (2) comprises additives having promotive effect.

34. A method for desorption of acid gas from an acid gas rich absorption liquid by a system (1) having a steam part (3) and a process part (4), wherein the steam part (3) is arrange to indirectly heat the acid rich absorption liquid in the process part (4) and the steam part (3) and the process part (4) are separated to prevent intermixing of fluids in the steam part (3) with fluids in the process part (4), and the steam part (3) and process part (4) are integrated in a desorption cylinder (9), wherein a stationary stand (19) is provided with a first stationary shaft (21a) and a second stationary shaft (21b) which are coaxial with an axis of rotation A of the desorption cylinder (9), and where the first stationary shaft (21a) and the second stationary shaft (21b) extend into the desorption cylinder (9), wherein the steam part (3) is provided with a steam supply conduit (16) and a condensate outlet conduit (37) arrange along the first stationary shaft (21a) and the process part (4) is provided with a supply conduit (55) for supplying acid gas rich absorption liquid (2), and a lean absorption liquid outlet conduit (54) arranged along the second stationary shaft (21b), the method comprising the steps of
rotating the desorption cylinder (9) about a longitudinal axis of rotation A of the desorption cylinder (9),
distributing acid gas rich absorption liquid (2) in a desorption chamber (12) in the process part (4), the desorption chamber (12) comprising a stripper unit (33) having an integrated reboiler (52) that, in use, is arranged to receive steam supplied to the steam part (3) and acid gas rich absorption liquid (2) supplied to the process part (4) to thereby indirectly heat the acid gas rich absorption liquid (2),
forcing the absorption liquid to move towards a perimeter of the desorption chamber (12) by effect of centrifugal force,
feeding steam (5) to the steam part (3) and to the stripper unit (33),
stripping the acid gas rich absorption liquid (2) thereby forming acid gas rich vapour (8),
removing acid gas rich vapour (8) from the desorption chamber (12),
discharging acid gas lean absorption liquid (7) from the process part (4) by discharging means, discharging condensate from the steam part (3) by discharging means,
resulting in a stream of acid gas lean absorption liquid, a stream of acid gas rich vapour and a stream of condensate (6).

35. The method according to claim 34 further comprising distributing acid gas rich absorption liquid (2) by a liquid distributor (50) onto a desorber packed bed (51) arranged within the desorption chamber (12).

36. The method according to claim 34 further comprising forcing the acid gas rich absorption liquid (2) to move through at least one layer of desorber packed bed (51) by effect of centrifugal force.

37. The method according to claim 34 further comprising moving vapour (8) released from the acid gas rich absorption liquid (2) in a direction towards the desorption chamber (9).

38. The method according to claim 34 further comprising receiving steam condensate by a steam guiding chamber (13), and returning the steam condensate to a first liquid collecting chamber (11).

39. The method according to claim 38 further comprising collecting the steam condensate in the first liquid collecting chamber (11).

40. The method according to claim 34 further comprising transferring the acid gas lean absorption liquid (2) to a second collecting chamber (11).

41. The method according to claim 34 further comprising collecting the acid gas lean absorption liquid (2) in a second liquid collecting chamber (14).

42. The method according to claim 34 comprising forming a liquid layer on at least a portion of an outer perimeter of a liquid collecting chamber (11,14) by rotating the desorption cylinder (9).

43. The method according to claim 34 comprising recovering energy supplied to the system (1).

44. The method according to claim 34 comprising discharging condensate (6) by a first diffuser (42).

45. The method according to claim 34 comprising discharging acid gas lean absorption liquid (7) by a second diffuser (42).

46. The method according to claim 34 comprising recovering energy by converting kinetic energy in a liquid layer (41,65) into a pressure head by a diffuser (42) and using the pressure head to discharge liquid from a liquid collecting chamber (11,14).

47. The method according to claim 34 comprising operating the system (1) with a pressure difference between the steam part (3) and the process part (4), the pressure difference being up to 10 Bar.

\* \* \* \* \*